United States Patent [19]

Noguchi et al.

[11] 4,237,030

[45] Dec. 2, 1980

[54] CATALYST FOR PURIFYING EXHAUST GAS FROM AN INTERNAL COMBUSTION ENGINE

[75] Inventors: Masaaki Noguchi, Nagoya; Tsuchio Bunda, Okazaki; Noboru Yamamoto; Shigeo Soejima, both of Nagoya, all of Japan

[73] Assignees: Toyota Jidosha Kogyo Kabushiki Kaisha, Aichi; Nippon Gaishi Kabushiki Kaisha, Nagoya, both of Japan

[21] Appl. No.: 923,202

[22] Filed: Jul. 10, 1978

Related U.S. Application Data

[63] Continuation of Ser. No. 655,894, Feb. 6, 1976, abandoned.

[30] Foreign Application Priority Data

Mar. 13, 1975 [JP] Japan .................................. 50-30698

[51] Int. Cl.$^3$ ...................... B01J 21/02; B01J 21/04; B01J 21/12; B01J 23/42
[52] U.S. Cl. ................................ 252/432; 252/455 R; 252/465; 252/466 PT; 423/213.5
[58] Field of Search ................... 252/432, 455 R, 463, 252/464, 465, 466 J, 466 PT; 423/213.2, 213.5, 628

[56] References Cited

U.S. PATENT DOCUMENTS

| | | | |
|---|---|---|---|
| 3,392,125 | 7/1968 | Kelly et al. | 252/463 X |
| 3,565,830 | 2/1971 | Keith et al. | 252/466 PT |
| 3,881,696 | 5/1975 | Lepeytre et al. | 252/465 X |
| 3,931,054 | 1/1976 | Lester | 252/466 PT |

*Primary Examiner*—W. J. Shine
*Attorney, Agent, or Firm*—Brisebois & Kruger

[57] ABSTRACT

A catalyst support characterized by having a total pore volume ranging 0.05–0.5 cc/g. an average pore diameter ranging from 0.05–5μ and consisting mainly of α-alumina; and an internal combustion engine exhaust gas purifying catalyst made of said catalyst support carrying a catalytic agent.

6 Claims, 8 Drawing Figures

CATALYST FOR PURIFYING EXHAUST GAS FROM AN INTERNAL COMBUSTION ENGINE

This is a continuation of application Ser. No. 655,894, filed Feb. 6, 1976 and now abandoned.

BACKGROUND OF THE INVENTION:

The conventional catalysts used for purifying the exhaust gas of an internal combustion engine for a vehicle cannot always achieve a desired conversion efficiency through various engine running conditions, because the conversion efficiency of the conventional catalyst varies in accordance with the composition, concentration, flow rate and temperature of the exhaust gas which vary the engine running conditions. Particularly as illustrated by catalyst B in FIG. 1, the conversion efficiency of the catalyst steadily deteriorates as it is contaminated with specific ingredients of the exhaust gas and through thermal degradation as the running distance increases. Meanwhile the catalyst particles with their mechanical strength lowered by thermal degradation tend to be crushed and pulverised. As a result not only does the conversion efficiency of the catalyst drop, but also the crushed or pulverized particles clog the passage through which the exhaust gases flow, so as to decrease the output of the engine; and some portion of such particles are blown out of an exhaust pipe together with the exhaust gas. Moreover, as a the result of thermal shrinkage of the catalyst particles the gross volume of total catalyst particles decreases and a space is formed at the upper part of a catalyst container. Through the space exhaust gases pass without catalystic reaction thereby resulting in an imperfect purification.

To be more specific, the alumina support commonly used in the exhaust gas purifying catalyst is usually a formed product of a mixture of various crystalline transition aluminas which have been obtained by heating, dehydrating and calcinating the alumina hydrate. The alumina support is subjected to a wide range of temperature shocks from ambient temperature to the melting temperature of transition aluminas during calcination and during service. Meanwhile, for the purpose of increasing the reaction rate in the catalystic oxidation of unburnt hydrocarbons and carbon monoxide in the exhaust gas and thereby economizing on the volume of catalyst, the reaction should take place at a still higher range of temperature. Thus, the alumina which constitutes the carrier, being subjected to rigorous temperature conditions, makes a prominent crystal growth; develops sintering accompanied by transformation; and leaves much strain in the support, thereby lowering the mechanical strength of the support the conversion efficiency of the catalyst.

Figure 2:
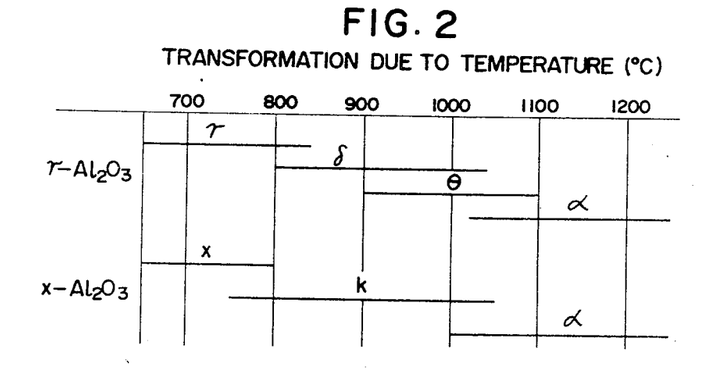
FIG. 2 illustrates an example of the transformation due to temperature in the alumina.

Though the exact progressive thermal transformations of the crystalline alumina is yet to be clarified, it is known as illustrated in FIG. 2 that boehmite changes into $\gamma$-alumina, the $\delta$-alumina into $\delta$-alumina in the range 800°–1050° C., the $\delta$-alumina into $\alpha$-alumina at 1000°–1100° C., and $\zeta$-alumina is obtained at 900° C. or thereabout. Namely, $\delta$-alumina can be easily obtained by calcinating boehmite at over 800° C. The $\delta$-alumina shows practically stable mechanical properties and $\alpha$-alumina is stable to heat. It is well-known that when $\theta$-alumina is obtained the mechanical strength is remarkably decreased.

One of the methods to prevent the physical deterioration of the transition alumina support of this kind due to transformation is to maintain a stable mechanically coherent state for a long time in a wide range of service temperatures, therefore the composition and calcination procedure of alumina hydrate have been studied. As a practical method normally growing to stabilize micro crystalline structures of transition alumina in the process of transformation has been utilized.

In the meantime a method of stabilization through addition of certain alkali earth metal compounds has been known. The effectiveness of this method is, however, confined to certain aluminas. Addition of alkali earth metal compounds causes the growth of skeleton structure of alumina, prevents transition to high density, and retains the mechanical strength, but it cannot assure the durability of a conversion efficiency.

Thus the above-mentioned conventional method cannot provide any satisfactory exhaust gas purifying catalyst.

SUMMARY OF THE INVENTION

The present invention relates to the catalyst for purifying the exhaust gas of an internal combustion engine. An object of the present invention is to provide a catalyst with better conversion efficiency, increased durability and excellent mechanical strength by improving the characteristics of a support to carry the catalystic agent.

DETAILED DESCRIPTION OF THE INVENTION

The present invention relates to an improved catalyst for exhaust gas purification with increased duration of the conversion efficiency and improved mechanical growth. The following is a specific description of the present invention.

Figure 3:
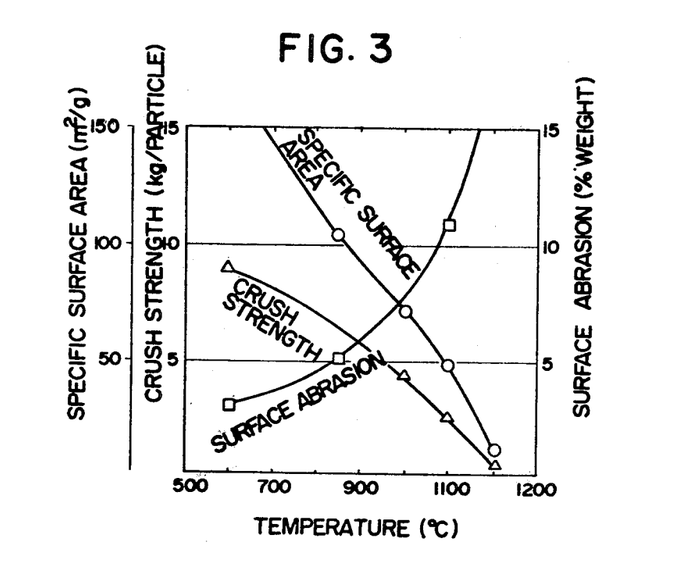
FIG. 3 illustrates the correlation between temperature and physical properties in said alumina.

It has been discovered that as long as transition alumina is used, the transition alumina makes crystalline growth and transformation in the temperature range corresponding to a wide range of engine drive conditions, as indicated in FIG. 3, its surface attrition increase, its crush strength decreases and its specific surface area is reduced through sintering, resulting in a sharp drop of the mechanical strength and the conversion efficiency.

As for the relation between the pore structure characteristics and the conversion efficiency of the alumina support for exhaust gas purifying catalyst, it has been considered that one consisting of micro pores and having a large specific surface area excels in the conversion efficiency and its durability. Thus the above-mentioned transition alumina support has been mainly used. However, in case of the purifying catalyst for an internal combustion engine for a vehicle wherein the reactant is flowing at a high space velocity, the major part of its purifying reaction takes place on the exterior surface of the catalyst particles, and accordingly for the purpose of increasing its reactivity it is necessary that both the diffusion and the reaction of reactant take place simultaneously on the internal surface of pore network near the exterior surface. Thus if the intra-pore diffusion is sufficiently fast as compared with the reaction, the reaction will progress at a uniform rate with a constant concentration of the reactant matter; but if the diffusion is not sufficiently fast as compared with the reaction, the concentration of the reactant inside the pore network will be lower than near the pore-mouth and in consequence the reaction rate will drop. The reason is as follows:

As to said reaction inside the pore network the smaller is the pore diameter, the larger the intra-pore diffusion resistance is, and the reaction rate in the catalyst particles will drop.

Therefore for the purpose of improving the conversion efficiency the exhaust gas with such high space velocity as in the case of an exhaust gas from an internal combustion engine it would be more effective to increase the pore diameter, as stated above as well as to promote the reaction in a high temperature range than to increase the number of micro pores or enlarge the specific surface area in the pore structure characteristics of the support.

Meanwhile it is generally admitted, though the reason is not yet fully classified, that the conversion efficiency of the exhaust gas purifying catalyst drops in the process of its use owing to poisoning with specific ingredients of the exhaust gas.

Namely, physical hindrance to reaction occurs because the surface of catalyst is covered with the combustion products of fuel, additives in lubricant, impurities such as phosphorus or lead compounds, and sulfur content in the exhaust gas, particularly when the pore diameter of the catalyst is small, the reaction inside the pore takes place near the external surface of the catalyst, therefore the pores on the catalyst surface will be easily clogged with the poisons, or the surface will be uniformly covered with the poisons which lead to less active purification of the catalyst. Chemical hindrance to reaction occurs because of solid phase reaction of said combustion products with the catalytic agent and the support material. In a range of low temperatures of the exhaust gas and the catalyst bed, physical hindrance of the purifying reaction comes mainly from the contaminants covering the catalyst surface. When the temperatures of the exhaust gas and the catalyst bed become high in this state, solid phase reaction starts among the poisons on the catalyst surface and between the poisons and the alumina, thereby promoting chemical hindrance to the reaction.

For this reason, in order to prevent its deterioration due to poisoning thereby making the life of the exhaust gas purifying catalyst prolonged, the physical hindrance to reaction in the low temperature range should be counteracted. Since, in the reaction inside the pore near the exterior surface of catalyst particle, if the pore diameter is small, the pores on the catalyst surface will be clogged with the contaminant or the catalyst surface will be uniformly covered with the poisons, which leads to less active purification of catalyst particles.

In case of a reactant flow like the exhaust gas of an internal combustiion engine which gas varies in temperature and contains poisons of specific elements, for the purpose of improving the conversion ratio of the catalyst to be used therefore and prolonging its life, it would be more effective to increase the pore diameter as stated above, as well as to promote the reaction in the high temperature range than to increase the number of micro pores and enlarge the specific surface area in the pore structure characteristics of the support.

According to the present invention, the above-mentioned drawback has been removed, the mechanical strength and the conversion efficiency of the catalyst are high. More specifically, the total pore volume is 0.05–0.50 cc/g, the average pore diameter is 0.05–5.0$\mu$, $\alpha$-alumina is the main component of the support, and a catalytic agent is carried by this support.

Thus the catalyst support of the present invention is mainly composed of $\alpha$-alumina which is free from crystalline change due to thermal degradation in time of purifying reaction and due to high temperature in time of unusual combustion. As indicated in FIG. 2, $\alpha$-alumina is the most heat-resistant of all aluminas. Therefore it is physically stable to thermal degradation in purifying reaction, it is free from distortion of crystalline structure or thermal deterioration due to thermal degradation such as seen with transition aluminas, and it excels in resistance to heat with no pulverization due to crushing or surface attrition.

Moreover when less than 20% in total of at least one from among $SiO_2$, $TiO_2$, $ZrO_2$, CaO, MgO, $B_2O_3$, $MnO_2$, $Cr_2O_3$ and CuO is added as the $\alpha$-alumina sintering promoter, the low-temperature sintering becomes possible and a support of higher strength can be obtained. More than 20% content of these compounds, however, is not desirable, because the mechanical strength, the purifying activity and the durability of catalyst drop as the result of the skeleton structure of heat-resistance $\alpha$-alumina being reduced and a stable micro pore structure being lost at high temperature of catalyst service.

The outstanding feature of the present invention lies in that the pore structure characteristics has been optimized for catalyst performance by setting the average pore diameter at 0.05–5.0$\mu$, which is far greater than in the conventional transition alumina; and setting the pore volume at 0.05–0.50 cc/g.

Thus, the exhaust gas purifying catalyst, if its CO conversion ratio is maintained at over 80% and its HC conversion ratio at over 70% in a specified service period, can be called practically useful.

Figure 4:
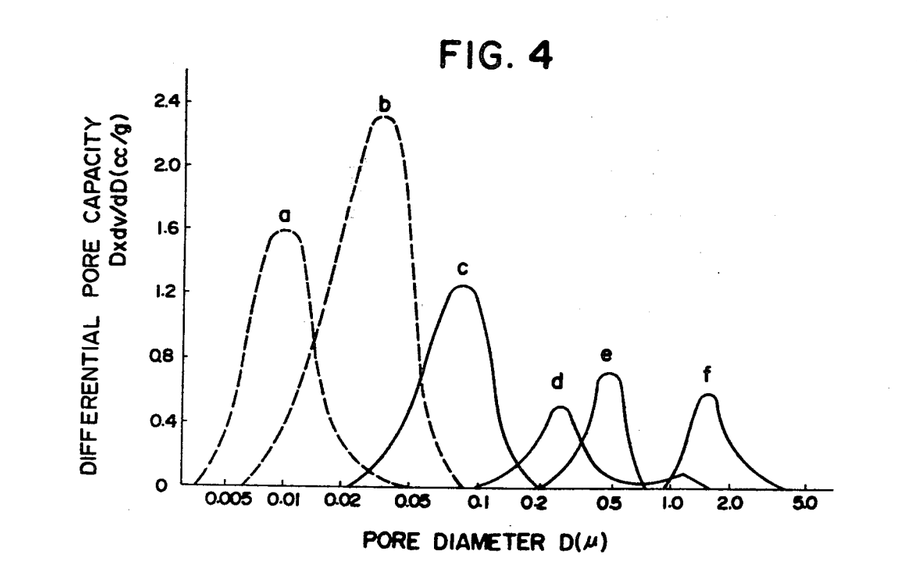
FIG. 4 shows the pore size distribution of the invented alumina support with that of the conventional one.

In FIG. 4 illustrating the pore size distribution curves for various alumina supports, the supports a, b are transition aluminas used in the conventional exhaust gas purifying catalyst, the average pore diameter thereof being less than 0.05$\mu$, and the supports c, d, e, f are $\alpha$-alumina supports according to the present invention, the average pore diameter thereof being in the range of 0.05–5.0μ. The pore structure and the conversion efficiency of the exhaust gas purifying catalysts carrying therein a precious metal, which catalyst are produced by the conventional method are listed in Table 1. The conversion ratio of catalysts listed in Table 1 are values measured according to the Japanese Emission Test Procedure (10 mode cycles test) for the national regulation 1975 which is equivalent to 30,000 km run on a simulated stationary engine-dynamometer installation in accordance with the specified durability test pattern.

TABLE 1

| Support | Support pore structure | | Catalyst Durability Conversion ratio (%) | |
| --- | --- | --- | --- | --- |
| | Mean pore diameter (μ) | Total pore volume (cc/g) | HC | CO |
| a | 0.01 | 0.65 | 45 | 75 |
| b | 0.03 | 1.15 | 45 | 75 |
| c | 0.08 | 0.50 | 82 | 99 |
| d | 0.25 | 0.23 | 95 | 98 |
| e | 0.50 | 0.19 | 94 | 94 |
| f | 1.20 | 0.12 | 93 | 93 |

It is seen from Table 1 that catalysts of which supports are a and b have a low HC conversion efficiency of less than 50% and a low CO conversion ratio of less than 75%, while catalysts of carriers c, d, e, f have high HC and CO conversion ratio with excellent durability. It should be noted that both the conventional catalyst and the invented catalyst exhibit the initial values of HC and CO conversion ratio of more than 90%.

Figure 5:
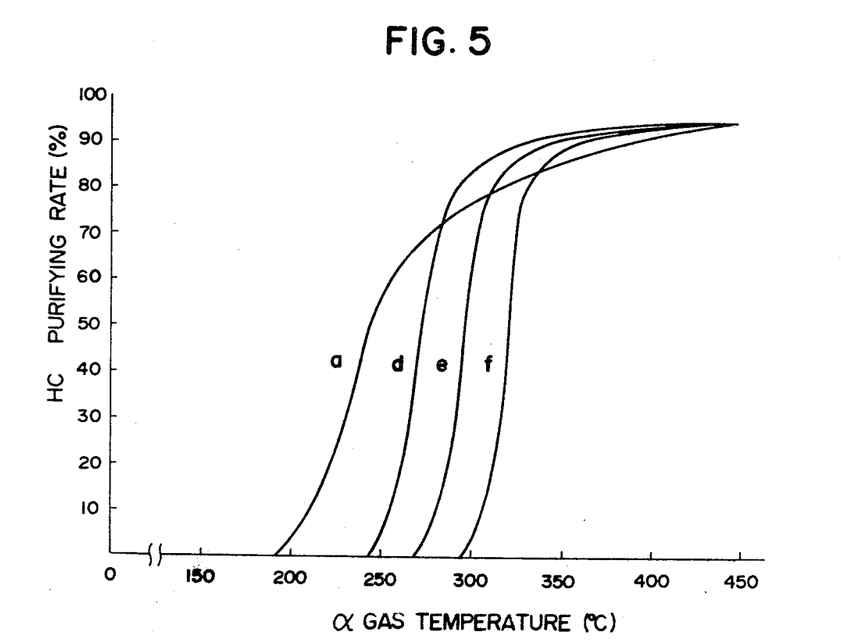
FIG. 5 shows the correlation between the hydrocarbons conversion ratio and the gas temperature in the case of a catalyst using the alumina support illustrated in FIG. 4 as a support.

FIG. 5 indicates the light-off temperature of a catalyst consisting of the invented α-alumina as a support thereof. In this Figure the relations between the HC conversion ratio and the gas temperature as measured using a blending gas simulating the actual exhaust composition are indicated as for catalysts which are characterized by activating 10 g/l of platinum on the supports d, e, f with an average pore diameter in the range of 0.05–5.0μ and the support a with an average pore diameter 0.01μ in FIG. 4.

As indicated in FIG. 5 considering the conversion reaction of catalyst, it is necessary (1) that the conversion light-off temperature of the catalyst be low for the purpose of iniciating conversion reaction even when the heat quantity of the gas supplied to the catalyst bed is low at starting of the engine; (2) that the increment of the conversion ratio be high relative to the inlet gas temperature rise on the catalyst bed for the purpose of fast spreading this reaction over the entire area; and (3) that the catalyst have a high maximum conversion ratio, and be able to approximately constantly maintain the conversion ratio at around the maximum value even when the temperature of the catalyst bed rises. Generally speaking, as compared with the HC conversion ratio, the CO conversion ratio progresses selectively at low temperatures and has a high value. That is, carbon monoxide is easily purified even at low temperature while hydrocarbon is not.

To be able to effectively purify at low temperature, the exhaust gas purifying catalyst should start having an enough conversion efficiency of HC at less than 320° C. at which HC conversion is difficult to take place by the conventional catalyst.

Figure 6:
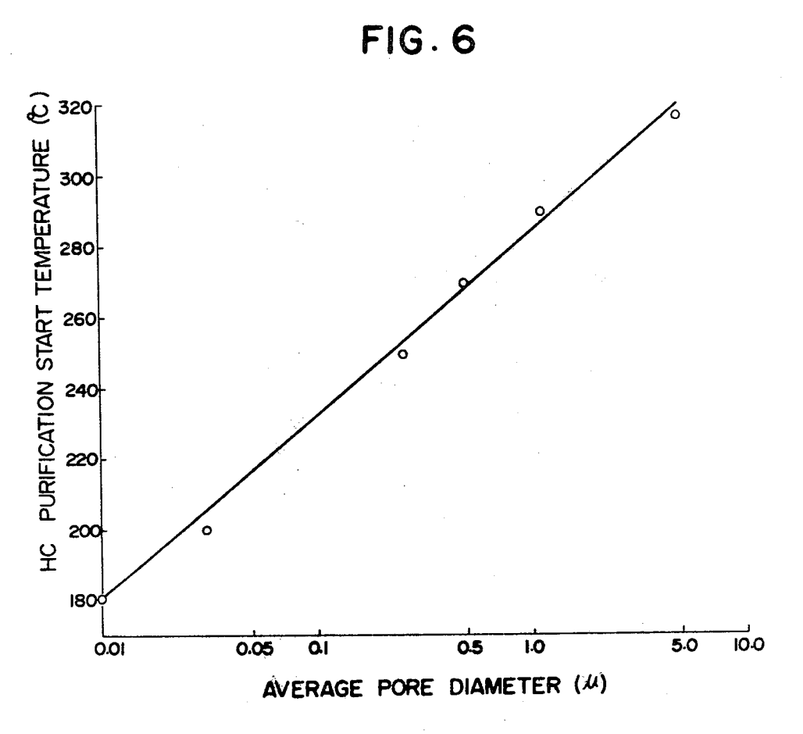
FIG. 6 shows the correlation between the average pore diameter and the hydrocarbons conversion light-off temperature in the catalyst using the alumina support illustrated in FIG. 4.

FIG. 6 illustrates the correlation between the average pore diameter of the invented α-alumina support as indicated in FIG. 5 and the HC conversion light-off temperature of a catalyst with this support.

According to FIG. 6, the upper limit of the average pore diameter should be set at less than 5.0μ; if it is less than 5.0μ, the HC conversion light-off temperature can be satisfactory. Therefore the average pore diameter is limited to the range of 0.05–5.0μ. From the standpoint of durability and mechanical strength, the range of 0.1–2.0μ is preferable.

Figure 7:
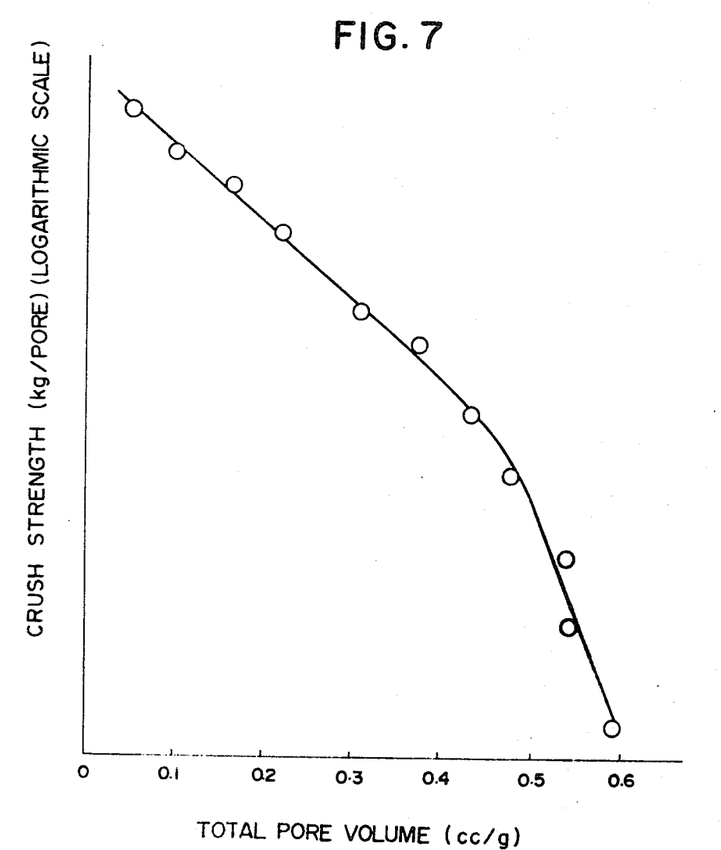
FIG. 7 illustrates the correlation between the total pore volume and the crush strength of $\alpha$-alumina support.

FIG. 7 illustrates the correlation between the pore volume and the crushing strength of α-alumina support.

As described above, the mechanical strength of the catalyst decreases in the course of its use and the catalyst becomes easy to crush and pulverize. However, any catalyst, regardless of what shape it has, which has a crush strength of over 5 kg/particle may decrease due to crushing and attrition in volume by less than 5% during its use. Such a catalyst can be practically used for the exhaust gas purification.

As seen from FIG. 7, with an increase in the total pore volume, the catalyst becomes porous and thereby its strength is lowered; and when the total pore volume exceeds 0.5 cc/g, its strength sharply drops. In the pore structure of the carrier, however, if the total pore volume is set at less than 0.5 cc/g, a sharp drop in the strength can be averted and this, together with the sharp effect, makes it possible to assure the necessary crushing strength for the exhaust gas purifying catalyst and render it practically useful.

Figure 8:
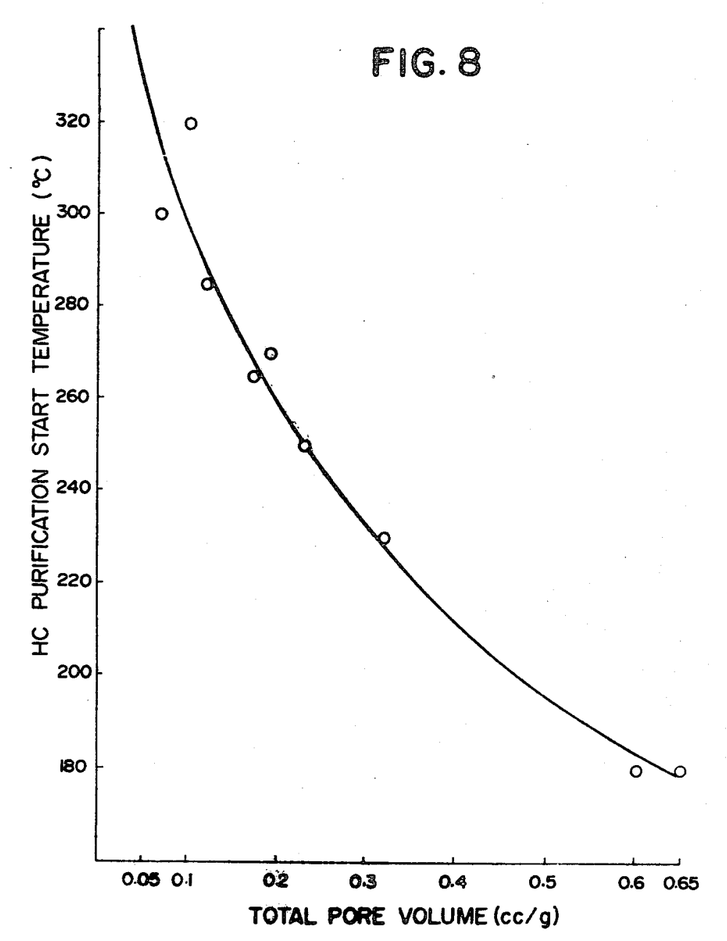
FIG. 8 illustrates the relation between the total pore volume and the HC conversion light-off temperature of a catalyst using $\alpha$-alumina support.

FIG. 8 illustrates the correlation between the pore volume of the α-alumina support and the HC conversion light-off temperature of a catalyst on this support.

With a decrease in the total pore volume, the invented support has its crush strength remarkably increased. Thus its strength is all right, but the support becomes dense, losing its porosity and lowering its low-temperature reactivity. FIG. 8 shows that with a decreased pore volume, the purification start temperature rises; when the pore volume comes close to 0.05 cc/g, the HC conversion light-off temperature reaches about 320° C.; when said volume becomes lower than that, the HC conversion light-off temperature suddenly rises, hindering the low-temperature reaction. It is seen that the range of total pore volumes satisfying the above conditions is over 0.05 cc/g.

As described above, it is practically desirable to set the total pore volume of catalyst carrier at 0.05–0.50 cc/g. considering the conversion performance and the mechanical strength of the catalyst; but a more desirable range would be 0.10–0.35 cc/g.

Use of the invented catalyst support is not confined to the exhaust gas purification device for an internal combustion engine.

The catalyst support generally has a spherical or columnar shape and is built up of a catalyst bed with the support imparts the necessary performance. The α-alumina support with a high bulk density and a high heat capacity tends to make the conversion light-off temperature; given a cylindrical shape, it can be expected to produce an excellent effect. In the case of a cylindrical support, in which the volume of gas flowing through the internal passage can be made less than that of gas flowing outside, contamination with specific components of the exhaust gas can be more effectively prevented and the purifying effect can be maintained in a high space velocity range, thereby reducing the consumption of catalyst. Thus the most desirable shape of the invented catalyst carrier mainly composed of α-alumina is cylinder.

Next, the manufacture of catalyst according to the present invention is to be briefly described. α-alumina and an aluminum compound which yields α-alumina when fired are pulverized to a specified particle size distribution; and desirably, more than 80% of this pulverized product is mixed with less than 20% in total of at least one from among $SiO_2$, $TiO_2$, $ZrO_2$, CaO, MgO, $B_2O_3$, $MnO_2$, $Cr_2O_3$, CuO as the sintering promoter. To the obtained mixture is added and kneaded a common organic binder. A slurry thus kneaded is dried by a spray drier into a granular powder of excellent fluidity, which is then molded to a desired size and shape by the press; or a compound of said alumina material with a sintering promoter and an organic binder is molded to a desired size by the extrusion molding machine.

The molded product, when dried and then fired within a temperature range of 1100°–1500° C. where the alumina and the sintering promoter can be sintered together, yields an α-alumina support. Catalyst material such as precious metals of platinum family, metals like copper, nickel, cobalt, manganese, iron, vanadium, chrome and their oxides, when carried by this catalyst support, yields a catalyst according to the present invention.

The average pore diameter and the pore volume of the catalyst support can be adjusted by controlling the particle size and addition of the material alumina and the sintering promoter and the firing conditions. More than 20% content of the sintering promoter is not desirable, because it causes a drop in the strength of the catalyst carrier, an excessive sintering, a decrease in the pore volume; besides, the sintering is accelerated through thermal degradation during use, thereby adversely affecting the pore structure and the purifying performance.

The present invention is illustrated by the following examples.

EXAMPLE 1

A mixture of 96.0% of $\alpha$-$Al_2O_3$ having the average particle diameter of 1.4μ, 1.0% of $SiO_2$, 1.0%, of CaO, 1.0% of MgO and 1.0% of $B_2O_3$ was wet-ground by a ball mill. After being dried, 100 weights parts of said mixture was added with 5 parts of polyvinylalcohol and 20 parts of water; then thoroughly kneaded in a kneader; put through an extruder; the obtained extrudate was cut and then put through a tumbling granulator; the obtained 3.5 mm granules were dried and then fired for three hours in an oxidizing atmosphere at 1350° C., yielding a catalyst support. By routinely making 11 of this support with 1 g/l platinum as the catalytic agent, a catalyst according to the present invention was produced, the properties or it being summarized under specimen 1 in Table 2.

EXAMPLE 2

Using a mixture of 92.0% of $\alpha$-$Al_2O_3$ having the average particle diameter of 2.9μ, 5.0% of $SiO_2$, and 3.0% of $ZrO_2$, a catalyst was obtained in the same way as in Example 1, the properties of it being summarized under specimen 2 in Table 2.

EXAMPLE 3

Figure 1:
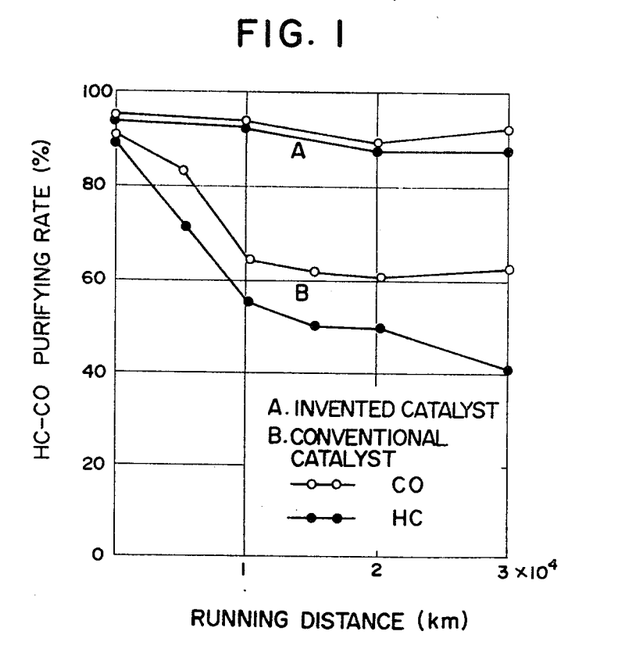
FIG. 1 illustrates the relationships between the conversion ratio of hydrocarbons and carbon monoxide in the exhaust gas and the running distance with respect to the invented catalyst and the conventional catalyst.

Using a mixture of 97.0% of $\alpha$-$Al_2O_3$ having the average particle diameter of 7.0μ, 1.0% of $ZrO_2$, 1.0% of $MnO_2$ and 1.0% of CuO, a cylindrical catalyst support having 2.5 mm outer diameter, 1.3 mm inner diameter and 2.9 mm length was obtained; and by making this carrier with a catalytic agent in the same way as in Example 1, a catalyst was produced, its properties being summarized under specimen 3 in Table 2, and the durability of its purifying performance being illustrated in FIG. 1A.

EXAMPLE OF CONVENTIONAL CATALYST 1

Using a mixture of 99.8% of $\gamma$-$Al_2O_3$, 0.1% of $SiO_2$, 0.05% of CaO and 0.05% of MgO, a 3.5 mm sphere of catalyst support was obtained and by making it with a catalytic agent in the same way as in Example 1, a catalyst was produced, its properties being summarized under specimen 4 in Table 2.

EXAMPLE OF CONVENTIONAL CATALYST 2

Using a mixture of $\gamma$-$Al_2O_3$ and 99.6% of $\theta$-$Al_2O_3$, 0.1% of CaO and 0.1% of MgO, a 3.5 mm sphere of catalyst support was obtained and by making it with a catalytic agent in the same way as in Example 1, a catalyst was obtained, its properties being summarized under specimen 5 in Table 2 and the durability of its purifying performance illustrated in Table 1B.

TABLE 2

| Specimen No. (in Examples) | 1 | 2 | 3 | 4 | 5 |
|---|---|---|---|---|---|
| Shape | Sphere | Sphere | Cylinder | Sphere | Sphere |
| Dimensions (mm) | 3.5φ | 3.5φ | Out. dia. 2.5 In. dia. 1.3 Length 2.9 | 3.5φ | 3.5φ |
| Crystalline form | α | α | α | γ | γ θ |
| Total pore volume (cc/g) | 0.19 | 0.12 | 0.10 | 1.15 | 0.62 |
| Average pore diameter of whole sample | 0.50 | 1.0 | 2.50 | 0.03 | 0.01 |
| Crushing strength (kg/particle) | 23.0 | 30.5 | 7.5 | 2.5 | 7.0 |
| Catalytic agent species | Pt | Pt | Pt | Pt-Pd | Pd |
| Hc conversion ratio (%) Initial | 96 85 | 95 80 | 96 91 | 93 48 | 90 40 |
| Durability Volume loss (%) | 3 | 2 | 5 | 30 | 13 |

1 Total pore volume and mean pore diameter were measured by the mercury intrusion porosimetry.
2 Crushing strength of cylindrical catalyst was measured in radial direction.
3 Conversion ratio are the initial value measured using the blended gas and the value of specimen after durability test on the engine dynamometer installation (equivalent to 30,000 km run).
4 Volume loss is the volume % of specimen crushed in durability test on the stand.

As evident from Table 2 and FIG. 1, all catalysts according to the present invention show extremely small reduction in the conversion ratio after durability test, whereas the conversion ratio of the conventional catalysts decreases to around the half of the initial state after the test.

Thus the catalysts according to the present invention are found to have excellent durability.

As for the mechanical strength, the invented products in Examples 1 and 2 are far superior in the crushing strength to the conventional products 4 and 5 of the same shape. Also they have an extremely low volume loss and an extremely strong resistance to crushing and surface attrition.

We claim:
1. A catalyst for purifying exhaust gas from an internal combustion engine comprising: a catalyst carrier characterized by having a total pore volume of 0.05–0.50 cc/g, and an average pore diameter of

0.05–0.05μ, and consisting mainly of over 80% by weight of α-alumina and less than 20% by weight of sintering promoter; and a catalyst consisting essentially of platinum catalyst material.

2. The catalyst of claim 1, in which the total pore volume is 0.10–0.35 cc/g.

3. The catalyst of claim 1 wherein said sintering promoter is at least one compound selected from the group consisting of $SiO_2$, $TiO_2$, $ZrO_2$, CaO, MgO, $B_2O_3$, $MnO_2$, $Cr_2O_3$ and CuO.

4. The catalyst of claim 1 wherein said carrier is of spherical shape.

5. The catalyst of claim 1 wherein said carrier is of cylindrical shape.

6. The catalyst of claim 1 wherein said carrier is of columnar shape.

* * * * *